(12) United States Patent
van Zanten et al.

(10) Patent No.: US 8,800,860 B2
(45) Date of Patent: Aug. 12, 2014

(54) PLURALITY OF PLANT POTS FOR USE IN CULTIVATING PLANTS, ASSEMBLY COMPRISING SUCH A PLURALITY OF PLANT POTS, AS WELL AS A METHOD FOR CULTIVATING PLANTS

(75) Inventors: Evert van Zanten, Maasdijk (NL); Lars Dijkshoorn, Maassluis (NL)

(73) Assignee: E. van Zanten Holding B.V., Maasdijk (NL)

( * ) Notice: Subject to any disclaimer, the term of this patent is extended or adjusted under 35 U.S.C. 154(b) by 322 days.

(21) Appl. No.: 12/746,344

(22) PCT Filed: Dec. 4, 2007

(86) PCT No.: PCT/NL2007/050622
§ 371 (c)(1),
(2), (4) Date: Sep. 3, 2010

(87) PCT Pub. No.: WO2009/072868
PCT Pub. Date: Jun. 11, 2009

(65) Prior Publication Data
US 2011/0006111 A1    Jan. 13, 2011

(51) Int. Cl.
  *G06F 17/00*  (2006.01)
  *G06F 7/00*   (2006.01)
  *G06F 19/00*  (2011.01)
  *A01G 9/02*   (2006.01)
  *B29D 22/00*  (2006.01)

(52) U.S. Cl.
  USPC ........... 235/376; 235/375; 235/385; 235/454; 47/66.7; 47/41.01; 428/34.1

(58) Field of Classification Search
  USPC ................ 235/375–376, 492, 454, 385; 340/572.1; 47/66.7, 41.1; 428/34.1
  See application file for complete search history.

(56) References Cited

U.S. PATENT DOCUMENTS 5,575,107 A    11/1996   Doerr
(Continued)

FOREIGN PATENT DOCUMENTS

EP    0 668 012 A1    8/1995
EP    1 444 883 A1    8/2004
(Continued)

OTHER PUBLICATIONS

International Search Report, dated Oct. 21, 2008, from corresponding PCT application.

*Primary Examiner* — Michael G Lee
*Assistant Examiner* — Laura Gudorf
(74) *Attorney, Agent, or Firm* — Young & Thompson

(57) ABSTRACT

The invention relates to a plurality of at least 1000 plant pots for use in cultivating plants. Each plant pot has a side wall and bottom which delimit an interior space for substrate which is open at the top, in which the bottom has a bottom side which is turned away from the interior space. Each plant pot is provided with a tag which has an optically readable code. The tag is arranged on the bottom side of the bottom, and the optically readable code is turned away from the bottom so that it can read from below when the plant pot is upright. The invention furthermore relates to an assembly with these plant pots as well as to a method for cultivating plants.

23 Claims, 2 Drawing Sheets

(56) References Cited

U.S. PATENT DOCUMENTS

| | | | |
|---|---|---|---|
| 5,941,019 A * | 8/1999 | Guarriello et al. | 47/66.6 |
| 6,164,537 A | 12/2000 | Mariani et al. | |
| 2006/0086808 A1* | 4/2006 | Appalucci et al. | 235/492 |
| 2006/0169787 A1* | 8/2006 | Gelbman | 235/492 |
| 2006/0187048 A1* | 8/2006 | Curkendall et al. | 340/572.4 |
| 2007/0289211 A1* | 12/2007 | Lejeune et al. | 47/65 |
| 2008/0111696 A1* | 5/2008 | Chisholm | 340/572.8 |

FOREIGN PATENT DOCUMENTS

| | | | |
|---|---|---|---|
| JP | 05189588 A * | 7/1993 | G06K 1/12 |
| JP | 2002-307916 A | 10/2002 | |
| WO | 2008/085045 A1 | 7/2008 | |

\* cited by examiner

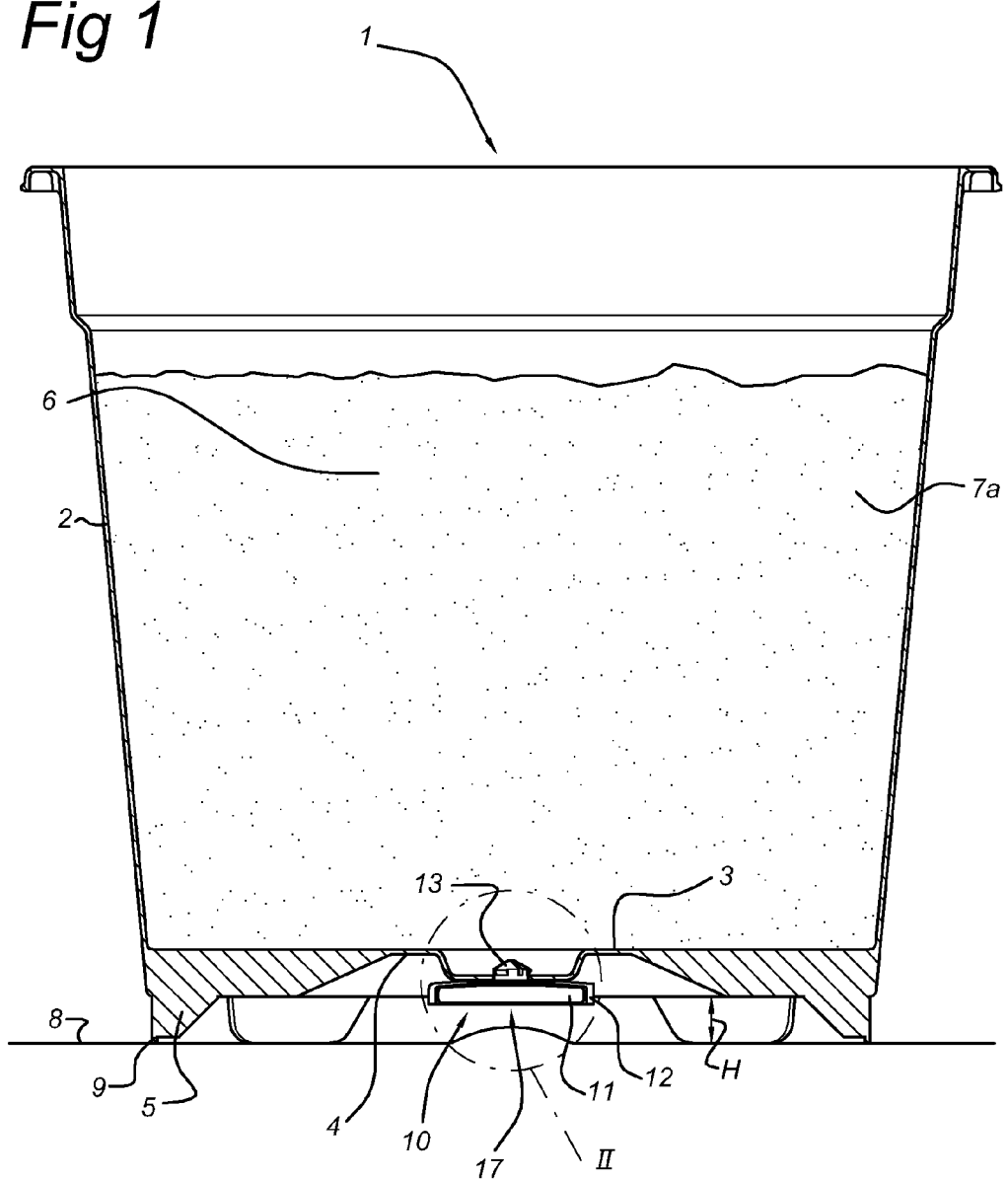

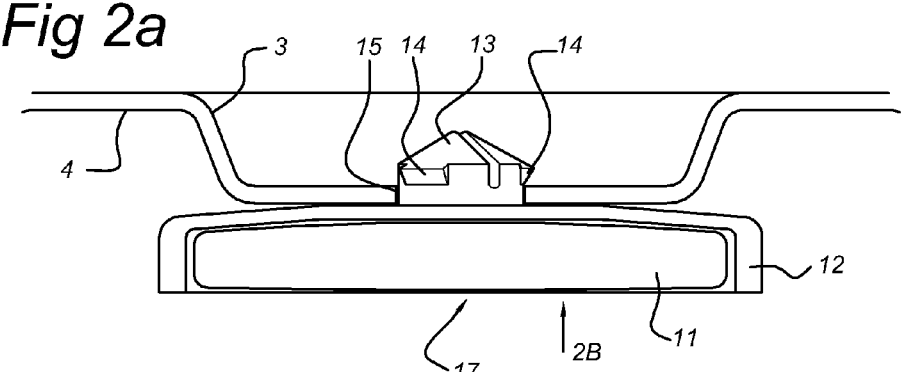
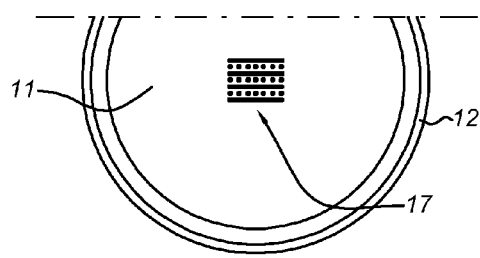
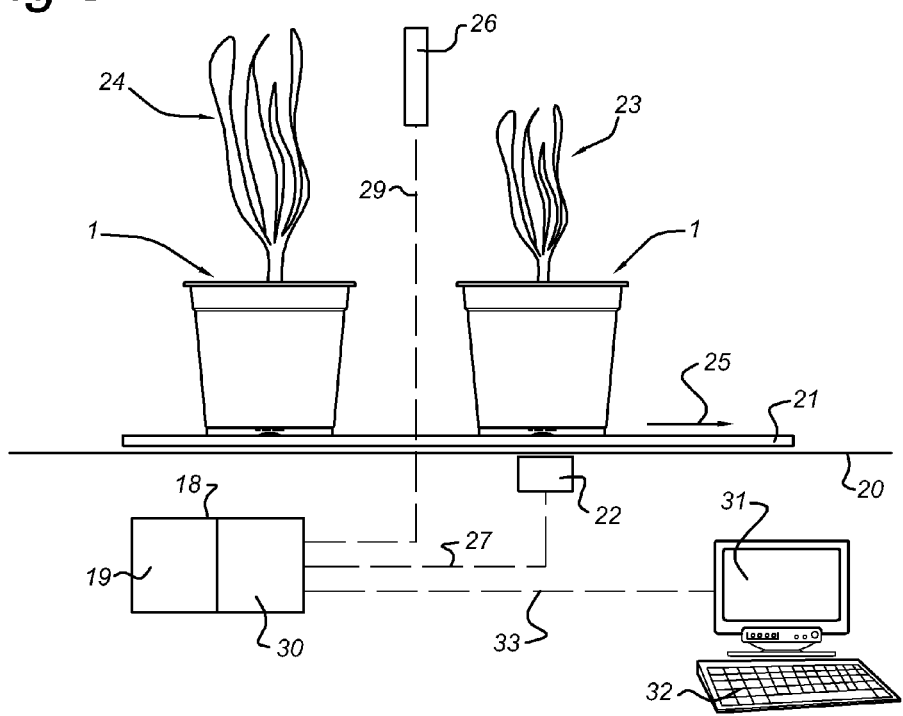

PLURALITY OF PLANT POTS FOR USE IN CULTIVATING PLANTS, ASSEMBLY COMPRISING SUCH A PLURALITY OF PLANT POTS, AS WELL AS A METHOD FOR CULTIVATING PLANTS

The present invention relates to a plurality of plant pots for use in cultivating plants, in which each plant pot comprises a side wall and a bottom, in which the side wall and bottom delimit an interior space for substrate which is open at the top, in which the bottom has a bottom side which is turned away from the interior space, and in which a number of the plant pots comprise a tag which is provided with an optically readable code.

A plurality of plant pots of this type is known from U.S. Pat. No. 6,164,537. This U.S. Pat. No. 6,164,537 relates to a stock-taking, distribution and presentation system for plants. Each plant pot has a bottom and a wall. This wall and bottom delimit an interior space which is open at the top and contains a substrate in which a plant grows. The plant pots are grouped into groups of six per tray. The tray and in each case one plant pot per tray are provided with a tag having an optically readable bar code. This system is not intended for cultivating plants, but is intended for exchanging information between the nursery where the plants are grown and the shop where the plants are sold. The tag on the plant pot is provided on the side, suspended from the top edge of the plant pot. For the purpose of U.S. Pat. No. 6,164,537, a tag provided on the wall of the plant pot may be effective, but it is not practical for cultivating plants when the grower wants to read this information. After all, plant leaves will in many cases obstruct the view, the plant pot will in each case first have to be positioned such that the tag is in the field of view, and usually many plant pots are grouped close together, so that the view of the wall of a plant pot is obstructed by the surrounding plants.

Furthermore, it is generally known to place labels, that is to say tags attached to a card or stick, in the substrate. Although such labels may be practical for consumer use, they are not practical for cultivating plants when the grower wants to read this information. In this case as well, the plant and surrounding plant pots containing plants obstruct the view. In addition, labels obstruct the light, which hampers the growth of the plants.

It is an object of the present invention to provide a plurality of plant pots which are provided with tags which can be read electronically in a simple and reliable manner so that, for example, use thereof in a highly automated cultivation management system is possible.

This object is achieved according to the invention by providing a plurality of plant pots for use in cultivating plants, in which each plant pot comprises a side wall and a bottom, in which the side wall and bottom delimit an interior space for substrate which is open at the top, in which the bottom has a bottom side which is turned away from the interior space, and in which each plant pot comprises a tag which is provided with an optically readable code, characterized by the fact that the tag is arranged on the bottom side of the bottom, by the fact that the optically readable code is turned away from the bottom so that it is readable by an optical read unit directed at the bottom side of the bottom;
by the fact that the plurality comprises at least 10,000 (ten thousand), in particular at least 100,000 (one hundred thousand), of said plant pots, and by the fact that the code of each plant pot can be distinguished from the codes of the other plant pots. In practice, a nursery will usually have 1,000,000 (one million) or more of these plant pots.

By attaching the optically readable tag, such as a tag comprising a bar code or dot code, to the bottom side of the bottom of a plant pot, said tag can be approached from below by means of a read unit while preventing contact with the plants. The read unit can be accommodated in or on the surface on which the plant pots are situated in a simple manner. By then passing the plant pots over the read unit, the codes on the bottom of the plant pots can be read out individually. It is also possible to pass the read unit under a plant pot or direct it at the bottom side of the plant pot in another manner in order to read the code. The plant pot may in this case also be held at an angle or upside down, if desired. The read unit may in this case also be a hand-held read unit, which is held in the hand and can be directed at an optical code in order to read it. Another possibility is to place the plant pots on a conveyor belt and pass them by the read unit in this manner. Reference may be made for example to EP-A-668,012 entitled "Method and installation for the cultivation of plants on a conveyor belt" in the name of Damsight for a system in which plant pots are situated on conveyor belts. Such conveyor belts can not only be used for the cultivation itself, but can also be used as a conveying system for conveying plant pots throughout the nursery, such as from the cultivation space to a treatment station and, if desired, vice versa (such as a treatment station for sorting, feeding, packaging, treating against diseases and/or pests, etc), to a further cultivation space, etc. With a system of this type, it is highly advantageous for managing the cultivation and the logistics when moving the plant pots to be able to identify the plant pots individually in order to be able to manage data relating to individual or groups of plant pots—including inter alia, monitoring, replenishing etc.—, to know the exact location of plant pots and to be able to keep track. The plurality of plant pots according to the invention makes this possible in an effective and simple way by the fact that the code of each plant pot can be read in a simple and reliable way without leaves or other parts of plants obstructing the view or without other plant pots being in the way. The read-out codes can then be processed in data management systems which are known per se in order to store the desired data of each plant pot.

In order to prevent the code from being soiled or damaged and thus in order to support a reliable reading of the code, it is advantageous, according to the invention if the plant pot has a lower side which defines a base which coincides with the surface on which the plant pot is situated when the plant pot is upright; in which a recess is provided on the bottom side of the bottom which is open towards the base and recedes with regard to the base, and in which the tag is recessed into said recess with the code at a distance from the base. The code is thus provided recessed into the bottom and at a distance from the surface. With a view to preventing dirt becoming stuck to the code, it is furthermore advantageous according to the invention if said distance is at least 1 mm, more particularly at least 3 mm, for example 5 mm or more or 10 mm or more.

According to yet a further embodiment, the tag, viewed in relation to the bottom, is arranged in the center. This has many advantages. Positioning the code with respect to the read unit, and thus reading of the code, is significantly facilitated as the read unit does not have to be directed specifically at the code, but only at the center of the bottom side of the bottom of the plant pot. This is advantageous with a hand-held read unit, as it is not necessary to look at the bottom to see where exactly the tag with the code is situated as it is always in the center—and this is also advantageous in the case of automated reading of the codes for similar reasons. In addition, it is sufficient to use a relatively small read unit. Furthermore, applying and, if desired, removing the tag is much easier as positioning only has to be carried out with respect to the center of the bottom.

According to a further embodiment, the tag of the plant pot is removable. Thus, the tag can be re-used on another plant pot, which is advantageous with a view to the costs related to cultivating plants. Removal may in this case sometimes result in damage to the plant pot, in particular to the bottom. Although damage of the plant pot or bottom thereof is not preferable for aesthetic reasons, it is usually the case that such damage does not affect the plants and will not be visible when the plant pot is upright.

According to yet a further embodiment, the tag is attached to the bottom by means of a snap connection. A snap connection in a simple manner provides a reliable connection which does not open spontaneously. Furthermore, a snap connection can be produced in automated fashion in a simple manner by moving the plant pot and the tag with respect to one another with a certain force—in order to overcome the snap—until the connection snaps into place. Another advantage of a snap connection is the fact that it can also be released, albeit with the use of some force. With a view to re-use, that part of the snap connection which is on the tag will be more stiff and strong than the part of the snap connection which is on the plant pot.

In this case, it is of particular advantage if the snap connection is designed such that the tag can be attached to the bottom by placing the tag and the bottom side of the bottom against one another using a relative movement at right angles to the bottom side of the bottom. With such a snap connection, approaching the bottom with a feeder which carries the tag is simple and, in addition, it is simple to retain the plant pot while a snap connection is brought about. If the weight of the plant pot does not suffice yet, the plant pot can be retained in a simple manner by means of detaining elements which engage with, for example, the top edge of the plant pot.

In this case, it is furthermore advantageous if the tag is provided with at least one insertion part on which at least one snap lug or at least one snap cavity is provided. Such an insertion part may for example be a pin having a mushroom-like head at its free upper end, the edge of which forms a snap lug. If suitably dimensioned, the head can then be inserted into a hole which is usually already provided in the bottom side of a plant pot until it has penetrated the hole and engages on the bottom at the top of the bottom. If the material of the bottom of the plant pot is sufficiently flexible, as is the case with some conventional plant pots, it is also possible to provide a snap cavity instead of a snap lug, into which it can then engage with the edge of the hole in the bottom in order to retain the pin. Incidentally, both in the case of a snap lug and in the case of a snap cavity, if the material of the bottom of the plant pot is suitable, it is also conceivable that no hole is provided for the pin in the bottom beforehand, but that this hole is pierced by the pin when the tag is being attached.

According to a further embodiment, the tag is attached to the bottom by means of a pivot connection, such as a bayonet-type connection, optionally in combination with a snap connection. A pivot connection, such as a bayonet-type connection, can be produced and can also be detached in an automated fashion in a relatively simple manner. Furthermore, detaching can be carried out without any, or hardly any damage to the bottom. In order to prevent inadvertent automatic detachment, it is advantageous with a pivot connection, in particular with a bayonet-type connection, to use it in combination with a snap connection. The snap connection will in this case essentially act as a lock.

According to a further embodiment of the invention, the code of each plant pot is a code from a unique coding system. In this case, the term unique coding system is understood to mean a coding system which has more than 10 million, preferably more than 100 million, most preferably more than 1000 million, different codes. Such coding systems are known per se in the form of bar codes as well as in the form of dot codes and other types of coding. The advantage of using such a unique coding system for cultivating plants is that it is possible to process very large numbers of plant pots and identify each one individually. A further advantage is that when a plant pot has left the nursery, the code which is associated with said plant pot is not required immediately again and thus the data associated with said plant pot can easily be stored for some time, for example for research in order to optimize the cultivation process further.

According to a further aspect, the invention furthermore relates to an assembly for use in cultivating plants, comprising:
  a plurality of plant pots according to the invention;
  a computer system having a database in which the codes of the plant pots are stored and which database is designed for storing data for each code which are attributed to said code;
  at least one optical read unit for optically reading the code of one or more of the plant pots, which optical read unit is connected, or at least connectable, to the computer system for sending the read-out codes to the database;
  a processing unit designed for attributing data to each said read-out code and storing data attributed to each respective read-out code with said code in the database.

Such an assembly provides support for managing the cultivation process in a simple and reliable manner. Using the data stored with the codes in the database, it is for example possible to see if and where there are plant pots which are ready or nearly ready for sale; to control the feed and the climatological conditions of the plants using these data, if desired completely automatically; to investigate further optimization of the cultivation process, the genetics, etc. With this aspect, it is furthermore advantageous if the computer system furthermore comprises a retrieval unit for retrieving one of more of said codes and the data attributed thereto from the database; and/or if the computer system furthermore comprises a display unit for displaying one or more of said codes and data attributed thereto.

According to a further embodiment, it is advantageous according to the invention if the assembly furthermore comprises at least one sensor unit for determining a characteristic—such as size, color, number of flowers, number of leaves, etc.—of a plant in a plant pot, in which the sensor unit is connected, or at least can be connected, to the processing unit and/or read unit for passing the specific characteristic to the processing unit or read unit, respectively. Thus, it is possible to collect and manage specific data for each plant.

According to yet a further aspect, the invention relates to the use of a plurality of plant pots according to the invention in cultivating plants; and the use of an assembly according to the invention in cultivating plants.

According to yet a further aspect, the invention relates to a method for labeling a plurality of at least 1000 plant pots, in which each plant pot is provided on the bottom side with an optically readable code which is unique with respect to the codes of the other plant pots; and in which each code is provided in such a way that it can be read on and from the bottom side of the plant pot by means of an optical read unit.

According to yet a further aspect, the invention relates to a method for cultivating plants, in which in a step a), an assembly according to the invention is used;

in a step b), the code of one or more of the plant pots is read out by said at least one optical read unit;

in a step c), the processing unit is provided with data relating to the plant that is grown in the plant pot, the code of which is read out in step b);

in a step d), the codes read out in step b) are sent to the processing unit;

in a step e), the processing unit stores the data obtained in step c) in the database with each code received in step d).

It is possible to carry out step c) separately from the other steps (stand alone) and temporarily store the read codes in order to then present them as a batch in step d). This makes it possible to use read units which do not have to be permanently connected to the computer system. Furthermore, it will be clear that it is also possible to use several read units simultaneously and that it is then possible to provide specific data for the processing unit per read unit in step c). For example, when sorting for large and small plants, it is possible to read the codes of the plant pots containing small plants with one read unit and the codes of the plant pots with large plants with the other read unit. Similar sorting for number of flowers or other characteristics is also possible. Furthermore, it is possible to use a read unit and to input into said read unit whether the plants have one or the other characteristic.

In order to monitor further data during cultivation, it is in this case advantageous according to the invention if, during cultivation, the steps b), c), d) and e) are repeated one or more times in order to modify or add data in the database. This can be carried out, for example, in connection with—that is to say before, after or during—a treatment, in which case the data relating to said treatment are sent to the processing system in step c) in order to store these in the database in step d) together with the codes read out in step c).

For efficient, optionally automated, reading of the codes, it is advantageous according to the invention if the optical read unit used in step b) is directed upwards in order to read a code which is situated above it and directed downwards; and in which the plant pots in step b) are successively supplied to the read unit upright and in a row and are successively passed upright over the read unit while the code is read out. Directing the read unit upwards may optionally be carried out with the aid of one or more mirrors and/or prisms.

According to a further embodiment of the method according to the invention, it is advantageous if, in step c), a characteristic of a plant—such as size, color, number of flowers, number of leaves, etc.—in a certain plant pot is determined, and in which, in step b), the code of said specific plant pot is read. Thus, it is possible to collect and manage specific data for each plant. In this case, determining the characteristic may be carried out in an automated manner by means of a sensor unit or by an individual, either by hand or visually.

If the tags are of a relatively expensive design, it is advantageous with the method according to the invention if:

the tags are removed from the plant pots when the cultivation of certain plants has ended; and these removed tags are attached to other plant pots.

The present invention will be described below in more detail with reference to a diagrammatically illustrated example, in which:

FIG. 1 shows a diagrammatic cross section of a plant pot according to the invention;

FIG. 2 shows detail II from FIG. 1 on an enlarged scale; and

FIG. 3 highly diagrammatically shows a conveyor track with plant pots according to the invention thereon.

FIG. 1 shows a plant pot according to the invention. The plant pot 1 has a wall 2 and a bottom 3. The wall 2 and the bottom 3 delimit an interior space 6 for substrate 7 which is open at the top.

The substrate 7 as such may be any known kind of substrate or any kind of substrate still to be conceived, such as sand, mineral wool, etc. During cultivation, a plant will grow in the substrate. Two plants are denoted with reference numerals 23 and 24 by way of example in FIG. 3.

The bottom 3 has a top side which is turned towards the interior space 6 and a bottom side 4 which is turned away from the interior space. Under the bottom 3, reinforcement bodies 5 are provided which are known per se from the prior art. As is also known per se from the prior art, the bottom 3, or at least a part thereof, is at some distance above the surface 8 so that excess water can more easily drain away via holes (not shown) in the bottom 3 out of the plant pot.

A tag 10 is attached to the bottom on the bottom side 4 of the bottom 3. This tag 10 comprises a housing 12 in which a carrier 11 is accommodated on which an optically readable code 17 is depicted. Viewed with the plant pot in an upright position, this code is directed downwards so that it can be read by means of a read unit 22 which is directed at the bottom side 4 of the bottom 3 (see FIG. 3).

The top side of the housing 12 of the tag 10 is provided with a short, relatively wide pin 13 with a pointed top. This pin is provided with three snap lugs 14 (see FIG. 2), which are evenly distributed over the periphery of the pin 13. As can be seen in detail in FIG. 2, the pin 13 is inserted so far into a hole 15 in the bottom 3 that the snap lugs 14 engage with the top surface of the bottom 3. In this manner, the tag is reliably attached to the underside of the bottom 3 of the plant pot. The tag 10 can be removed from the plant pot 1 again by grasping it and pulling it sufficiently hard. The tag 10 can then be attached to another plant pot.

It will be clear to those skilled in the art that, according to the invention, the tag 10 can also be of a completely different design. The tag 10 may, for example, also be designed as a sticker with the code 17 displayed on it. However, the code 17 may also be provided directly on the bottom side 4 of the bottom 3, for example by means of a printing technique, in which case the code 17 and the tag 10 essentially coincide in the sense that the tag 10 is the code rather than comprises the code.

As can be seen in FIG. 1, the code 17 is a distance H above the surface 8 which the plant pot 1 is situated. This is achieved by the fact that the plant pot, on its lower side, has a base which is defined by one or more feet 9, by the fact that a recess 16 is provided on the bottom side 4 of the bottom, which is open towards the base and recedes relative to base, and by the fact that the tag 10 is recessed into said recess with the code at a distance H from the base. This thus prevents soil from sticking to the code and damage to the code. The distance H in this case is in particular 1 to 15 mm.

FIG. 3 highly diagrammatically shows a conveyor track 20 over which a conveyor belt 21 runs which can be driven in the direction of arrow 25 (and if desired also in the reverse direction). Two plant pots 1 containing, in this example, plants 23 and 24 of different size are situated on the conveyor belt 21. When passing the sensor unit 26, which is shown as an example of use, the height of the plant in the passing plant pot is determined. As soon as the plant pot then passes over the read unit 22, the code 17 is read and the height of the plant in this plant pot which was determined earlier can be attributed to the read code and stored in a database.

Furthermore, FIG. 3 diagrammatically shows a computer system 18 comprising a database 19 in which the codes of the plant pots are stored, together with the data attributed to said codes. Reference numeral 30 denotes a processing unit which is designed to attribute data—for example coming from sensor 26 and sent via signal line 29—to the code or codes—for example received via signal line 27 of read unit 22—of a plant pot or plant pots, respectively, and to store these in the database 19. Reference numeral 32 diagrammatically shows a retrieval unit 32—in this example a keyboard—and reference numeral 31 diagrammatically denotes a display unit—in this case a monitor, but this could also be a printer or the like. The retrieval unit 32 and display unit 31 are connected to the computer system by means of a signal line. It should be noted that the keyboard 32 can also be used as an input unit for inputting data associated with one or more codes.

It should be noted that the term 'plant pot' in this application is by no means limited to cylindrical tapering plant pots, as illustrated in the attached drawings. The term plant pot is understood in a general sense to mean each container comprising a side wall and bottom which delimit an interior space for substrate which is open at the top (filled with substrate in use). Such a container (in this application referred to as plant pot) may also have a block-like or other shape. Many different kinds of containers of this type (referred to as plant pots in this application) having various names are known in the field of the cultivation of plants.

The invention claimed is:

1. A method for cultivating plants, comprising:
   a) using an assembly for use in cultivating plants, comprising:
      a plurality of plant pots for use in cultivating plants, in which each plant pot comprises:
      a side wall (2), a bottom (3) and an open top,
      the side wall (2) and the bottom (3) delimiting an interior space (6) with plant material substrate (7) containing a plant,
      the bottom (3) having a bottom side (4) which is turned away from the interior space (6), the bottom (3) having a hole (15); and
      a reusable and removable tag located on a downward facing surface of the bottom (3), the tag provided with an optically readable code, the optically readable code readable by an optical read unit, located below the bottom (3), and directed upward at the downward facing surface of the bottom (3),
      the tag comprising a housing (12) in which a carrier (11) is accommodated on which carrier (11) the optically readable code (17) is located, a top side of the housing (12) of the tag (10) provided with a pin (13), the pin (13) being inserted through the hole (15) of the bottom (3) the tag (10) being hand-removable from the bottom (3) by grasping and pulling for reuse with another of said plant pots,
      the code of each plant pot is distinguishable from the codes of the other plant pots, and
      a computer system having a database in which the codes of the plant pots are stored and which database is designed for storing data for each code which are attributed to said code;
      at least one optical read unit for optically reading the code of one or more of the plant pots, which optical read unit is connected, or at least connectable, to the computer system for sending the read-out codes to the database; and
      a processing unit designed for attributing data to each said read-out code and storing data attributed to each respective read-out code with said code in the database;
   b) reading out the code of the plant pots by said at least one optical read unit;
   c) providing the processing unit with data relating to the plant that is grown in the plant pot, the code of which is read out in step b);
   d) sending the codes read out in step b) to the processing unit; and
   e) using the processing unit, storing the data obtained in step c) in the database with each code received in step d), wherein,
   the pin has a width greater than a height thereof,
   the pin has plural snap lugs (14) distributed over a periphery of the pin (13),
   the pin (13) is inserted through the hole (15) of the bottom (3) with the snap lugs (14) engaged with a top surface of the bottom (3).

2. The method according to claim 1, wherein reinforcement bodies (5) are provided under the bottom (3) along a perimeter of the bottom (3) to hold the optically readable code (17) a fixed height off a surface upon which the plant pot is placed so that the height of the optically readable code (17) of each plant pot, when passed over the optical read unit, is fixed.

3. The method according to claim 1, wherein the pin has a width greater than a height thereof.

4. The method according to claim 1, wherein the pin has a pointed top.

5. The method according to claim 1, wherein the pin has plural snap lugs (14) distributed over a periphery of the pin (13).

6. The method according to claim 5, wherein the pin (13) is inserted through the hole (15) of the bottom (3) with the snap lugs (14) engaged with a top surface of the bottom (3).

7. The method according to claim 1, wherein, during cultivation, the steps b), c), d) and e) are repeated one or more times in order to modify or add data in the database.

8. The method according to claim 1, wherein,
   the optical read unit used in step b) is directed upwards in order to read a code which is situated above said optical read unit and directed downwards; and
   in which the plant pots in step b) are successively supplied to the read unit upright and in a row and are successively passed upright over the read unit while the code is read out.

9. The method according to claim 1, wherein,
   in step c) a characteristic of a plant in a certain plant pot is determined, and
   in step b), the code of said specific plant pot is read.

10. The method according to claim 1, wherein,
    the tags are removed from the plant pots when the cultivation of certain plants has ended; and
    said removed tags are attached to other plant pots.

11. The method according to claim 1, wherein the plurality comprises at least 10,000 of said plant pots.

12. The method according to claim 1, wherein,
    reinforcement bodies (5) are provided under the bottom (3) along a perimeter of the bottom (3) to hold the optically readable code (17) a fixed height off a surface upon which the plant pot is placed so that the height of the optically readable code (17) of each plant pot, when passed over the optical read unit, is fixed.

13. A plant pot for use in cultivating plants, comprising:
    a side wall (2), a bottom (3) and an open top,
    the side wall (2) and the bottom (3) delimiting an interior space (6) with plant material substrate (7) containing a plant, the bottom (3) having a bottom side (4) which is turned away from the interior space (6), the bottom (3) having a hole (15); and a reusable and removable tag located on a downward facing surface of the bottom (3), the tag provided with an optically readable code, the optically readable code readable by an optical read unit, located below the bottom (3), and directed upward at the downward facing surface of the bottom (3), the tag comprising a housing (12) in which a carrier (11) is accommodated on which carrier (11) the optically readable code (17) is located, a top side of the housing (12) of the tag (10) provided with a pin (13) inserted through the hole (15) of the bottom (3) the tag (10) being hand-removable from the bottom (3) by grasping and pulling for reuse with another of said plant pots, wherein the pin has plural snap lugs (14) distributed over a periphery of the pin (13).

14. The plant pot according to claim 13, wherein reinforcement bodies (5) are provided under the bottom (3) along a perimeter of the bottom (3) to hold the optically readable code (17) a fixed height off a surface upon which the plant pot is placed so that the height of the optically readable code (17) of each plant pot, when passed over the optical read unit, is fixed.

15. The plant pot according to claim 13, wherein the pin (13) has a width greater than a height thereof.

16. The plant pot according to claim 13, wherein the pin has a pointed top.

17. The plant pot according to claim 13, wherein the pin (13) is inserted through the hole (15) of the bottom (3) with the snap lugs (14) engaged with a top surface of the bottom (3).

18. A plurality of plant pots for use in cultivating plants, in which each plant pot comprises:

a side wall (2), a bottom (3) and an open top, the side wall (2) and the bottom (3) delimiting an interior space (6) with plant material substrate (7) containing a plant, the bottom (3) having a bottom side (4) which is turned away from the interior space (6), the bottom (3) having a hole (15); and a reusable and removable tag located on a downward facing surface of the bottom (3), the tag provided with an optically readable code, the optically readable code readable by an optical read unit, located below the bottom (3), and directed upward at the downward facing surface of the bottom (3), the tag comprising a housing (12) in which a carrier (11) is accommodated on which carrier (11) the optically readable code (17) is located, a top side of the housing (12) of the tag (10) provided with a pin (13) inserted through the hole (15) of the bottom (3) the tag (10) being hand-removable from the bottom (3) by grasping and pulling for reuse with another of said plant pots, wherein, with each plant pot, the pin has plural snap lugs (14) distributed over a periphery of the pin (13).

19. The plurality of plant pots according to claim 18, wherein, with each plant pot, reinforcement bodies (5) are provided under the bottom (3) along a perimeter of the bottom (3) to hold the optically readable code (17) a fixed height off a surface upon which the plant pot is placed so that the height of the optically readable code (17) of each plant pot, when passed over the optical read unit, is fixed.

20. The plurality of plant pots according to claim 18, wherein, with each plant pot, the pin (13) has a width greater than a height thereof.

21. The plurality of plant pots according to claim 18, wherein, with each plant pot, the pin has a pointed top.

22. The plurality of plant pots according to claim 18, wherein, with each plant pot, the pin (13) is inserted through the hole (15) of the bottom (3) with the snap lugs (14) engaged with a top surface of the bottom (3).

23. The plurality of plant pots according to claim 18, wherein the plurality comprises at least 10,000 of said plant pots.

* * * * *